United States Patent
Yasui et al.

(10) Patent No.: US 9,624,994 B2
(45) Date of Patent: Apr. 18, 2017

(54) ELECTRIC LINEAR MOTION ACTUATOR AND ELECTRIC BRAKE SYSTEM

(71) Applicant: NTN CORPORATION, Osaka (JP)

(72) Inventors: Makoto Yasui, Shizuoka (JP); Makoto Muramatsu, Shizuoka (JP); Yuki Saoyama, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/785,662

(22) PCT Filed: Apr. 17, 2014

(86) PCT No.: PCT/JP2014/060903
§ 371 (c)(1),
(2) Date: Oct. 20, 2015

(87) PCT Pub. No.: WO2014/175153
PCT Pub. Date: Oct. 30, 2014

(65) Prior Publication Data
US 2016/0076607 A1   Mar. 17, 2016

(30) Foreign Application Priority Data

Apr. 22, 2013 (JP) ................................ 2013-089061

(51) Int. Cl.
*B60T 1/00* (2006.01)
*F16D 63/00* (2006.01)
(Continued)

(52) U.S. Cl.
CPC ............ *F16D 63/006* (2013.01); *B60T 1/005* (2013.01); *B60T 1/062* (2013.01); *B60T 13/741* (2013.01);
(Continued)

(58) Field of Classification Search
CPC ............ F16D 2125/44; F16D 2121/18; F16D 2121/24; F16D 63/006; Y10T 74/18704;
(Continued)

(56) References Cited

U.S. PATENT DOCUMENTS

RE32,860 E  *  2/1989  Clark .................... H01F 7/13
                                                    335/261
6,394,235 B1 *  5/2002  Poertzgen ............ B60T 1/005
                                                    188/106 F
(Continued)

FOREIGN PATENT DOCUMENTS

DE       3148503 A1 *  7/1983  ............... B41J 9/38
DE       4412621 A1 * 10/1995  ........... H01F 7/1607
(Continued)

OTHER PUBLICATIONS

Machine translation of DE 3148503 (no date).*
(Continued)

*Primary Examiner* — Nicholas J Lane
(74) *Attorney, Agent, or Firm* — Wenderoth, Lind & Ponack, L.L.P.

(57) ABSTRACT

An electric linear motion actuator includes a locking mechanism for locking and unlocking the rotor shaft of an electric motor. The locking mechanism includes circumferentially arranged locking holes provided in a gear of a reduction gear mechanism, a locking pin moved toward and away from the locking holes, and engaged in one locking hole to lock the gear when the locking pin is moved toward the gear, and a linear solenoid for moving the locking pin toward and away from the gear. The plunger of the linear solenoid and the locking pin are formed as separate parts, and disposed coaxial with each other with their end faces axially facing each other. This prevents the moment load applied from the gear to the locking pin from acting on the plunger, thereby (Continued)

preventing damage to a bobbin slidably supporting the radially inner surface of the plunger.

18 Claims, 5 Drawing Sheets

(51) Int. Cl.
  *F16H 25/24* (2006.01)
  *B60T 1/06* (2006.01)
  *B60T 13/74* (2006.01)
  *F16D 55/226* (2006.01)
  *F16D 65/18* (2006.01)
  *F16D 121/24* (2012.01)
  *F16D 125/40* (2012.01)
  *F16D 125/50* (2012.01)

(52) U.S. Cl.
  CPC ............ *F16D 55/226* (2013.01); *F16D 65/18* (2013.01); *F16H 25/2454* (2013.01); *F16D 2121/24* (2013.01); *F16D 2125/40* (2013.01); *F16D 2125/50* (2013.01)

(58) Field of Classification Search
  CPC ............... F16H 25/2454; H01F 7/1607; H01F 2007/163; B60T 1/005; B60T 1/062
  See application file for complete search history.

(56) References Cited

U.S. PATENT DOCUMENTS

| | | | | |
|---|---|---|---|---|
| 2005/0016799 A1* | 1/2005 | Severinsson | ............ | F16D 65/18 188/156 |
| 2005/0035321 A1* | 2/2005 | Uemura | ............... | F04B 27/1804 251/129.03 |
| 2005/0211938 A1 | 9/2005 | Ryuen et al. | | |
| 2010/0319477 A1* | 12/2010 | Tateishi | .............. | F16H 25/2454 74/411.5 |
| 2011/0247904 A1 | 10/2011 | Yamasaki | | |
| 2013/0186717 A1* | 7/2013 | Muramatsu | ............ | F16D 55/226 188/72.1 |
| 2015/0239333 A1* | 8/2015 | McGrew, Jr. | ........... | B60K 6/387 180/65.21 |
| 2016/0123412 A1* | 5/2016 | Iwata | ...................... | B60T 1/005 188/265 |

FOREIGN PATENT DOCUMENTS

| | | | | |
|---|---|---|---|---|
| DE | 102008010649 A1 * | 8/2009 | ........... | H01F 7/1607 |
| JP | 06-26002 | 4/1994 | | |
| JP | 2005-277306 | 10/2005 | | |
| JP | 2010-065777 | 3/2010 | | |
| JP | 2010-090959 | 4/2010 | | |
| JP | 2012-087889 | 5/2012 | | |
| JP | 5543766 B2 * | 7/2014 | | |

OTHER PUBLICATIONS

Abstract of DE 4412621 (no date).*
Abstract of JP 5543766 (no date).*
English-language abstract for DE 10 2008 010649 (Aug. 2009).*
International Search Report issued Jul. 22, 2014 in International (PCT) Application No. PCT/JP2014/060903.
Written Opinion of the International Searching Authority issued Jul. 22, 2014 in International (PCT) Application No. PCT/JP2014/060903 (with English translation).

* cited by examiner

ELECTRIC LINEAR MOTION ACTUATOR AND ELECTRIC BRAKE SYSTEM

TECHNICAL FIELD

The present invention relates to an electric linear motion actuator for linearly driving a driven member such as a brake pad, and an electric brake system including the electric linear motion actuator.

BACKGROUND ART

As electric linear motion actuators which include an electric motor as a driving source, those disclosed in the below-identified Patent Document 1 and Patent Document 2 are conventionally known.

Each of the electric linear motion actuators disclosed in the above mentioned Patent Document 1 and 2 include: a rotary shaft driven by an electric motor; an outer ring member supported movably in the axial direction; and planetary rollers mounted between the rotary shaft and the outer ring member. When the rotary shaft is rotated, the planetary rollers are allowed to rotate about their respective center axes while revolving around the rotary shaft, due to the interfacial friction between the rotary shaft and the planetary rollers, and the outer ring member moves in the axial direction due to the engagement between helical grooves or circumferential grooves provided on the radially outer surfaces of the respective planetary rollers and a helical rib provided on the radially inner surface of the outer ring member.

Since the electric brake system including the electric linear motion actuator disclosed in Patent Document 1 or 2 only has a function as a service brake, in which a braking force is controlled corresponding to the brake pedal operation by a driver, the electric motor needs to be kept energized in order to maintain the braking force at the time of parking, thereby consuming a large amount of electricity.

In order to solve the above mentioned problem, the present inventors have proposed an electric linear motion actuator, in which the braking force can be maintained even when the energization to the electric motor is terminated, in the below-identified Patent Document 3.

The electric linear motion actuator disclosed in Patent Document 3 includes a reduction gear mechanism configured to reduce the speed of the rotation of a rotor shaft of the electric motor and to transmit the reduced rotation to the rotary shaft. A plurality of locking portions are provided in a side surface of one of a plurality of gears constituting the reduction gear mechanism, circumferentially spaced apart from each other. When a locking pin capable of being moved forward and backward with respect to the locking portions is moved forward by actuating a linear solenoid, the locking pin is brought into engagement with one of the locking portions, thereby locking the gears. This allows the braking force to be maintained even when the energization to the electric motor is terminated.

Therefore, by including the above mentioned electric linear motion actuator in an electric brake system, it is possible to lock one of the brake pads with the brake pads pressing the disk rotor at a predetermined pressing force, at the time of parking. At the same time, an electric linear motion actuator compact in size can be provided.

PRIOR ART DOCUMENTS

Patent Documents

Patent Document 1: JP 2010-65777 A
Patent Document 2: JP 2010-90959 A
Patent Document 3: JP 2012-87889 A

SUMMARY OF THE INVENTION

Problems to be Solved by the Invention

In the electric linear motion actuator disclosed in Patent Document 3, when the locking pin is configured to be moved forward and backward by the linear solenoid, the locking pin is generally formed integrally with the distal end portion of a plunger provided in the linear solenoid.

However, when the present inventors prepared a linear solenoid formed integrally with the locking pin, mounted the linear solenoid in the electric linear motion actuator, and tested for the durability and the like, they have found the following problems.

Specifically, in order to form a magnetic circuit, the plunger is often made of low carbon steel, which is a ferromagnetic material. Since low carbon steel has a low mechanical strength, when the locking pin is made of the low carbon steel, the mechanical strength of the locking pin may not be sufficient. Therefore, when the locking pin is engaged with one of the locking portions provided in one of the gears to lock the gears, there is a potential risk that the locking pin is damaged due to the moment load applied by the one of the gears.

In addition, the magnetism generated by the plunger and a coil could leak to the locking pin to reduce the magnetic attraction force to the plunger, and as a result, the locking pin may not be reliably engaged with the one of the gears, possibly resulting in a reduced reliability of the locking operation.

In the linear solenoid, the plunger is provided so as to extend through a bobbin supporting the coil, and a clearance in the radial direction is provided between the radially inner surface of the bobbin and the radially outer surface of plunger. This clearance is preferably small, in terms of magnetic efficiency.

When the plunger is integrally formed with the locking pin, it is necessary to slidably guide the locking pin. Since a guiding portion for guiding the locking pin has a minute guiding gap, if the locking pin is tilted within the range permitted by the guiding gap due to the moment load applied by the gear with which the locking pin is engaged, the amount the tail portion of the plunger moves in the radial direction is increased, and the plunger abuts the radially inner surface of the bobbin with an impact. At this time, since the bobbin is made of a non-magnetic material, such as resin or copper, and thus has a low mechanical strength, the bobbin may be worn or damaged due to the contact with the plunger, which in turn could cause the plunger to get caught on the worn or damaged portion of the bobbin, thereby compromising the sliding properties.

Further, when the locking pin is engaged with one of the locking portions provided in one of the gears, the moment load applied to the locking pin by the one of the gears is also applied to both edges of the guiding portion which slidably guides the locking pin, and therefore, the guiding portion is more susceptible to deformation or abrasion.

In the reduction gear mechanism, grease is used to lubricate the meshing portion of gears, and if the grease enters into the clearance formed between the opposed surfaces of the plunger and the bobbin, through the guiding portion for the locking pin, the sliding properties of the plunger may be reduced. Since the viscosity of the grease is increased at a low temperature, in particular, it complicates the smooth movement of the plunger.

Accordingly, an object of the present invention is to provide an electric linear motion actuator in which the reliability of the locking operation, achieved by bringing the locking pin into engagement with one of the locking portions provided in one of the gears, is improved, and which has an improved durability.

Means for Solving the Problems

In order to solve the above mentioned problems, the electric linear motion actuator according to the present invention has adopted the following constitution.

An electric linear motion actuator comprising:

an electric motor having a rotor shaft;

a reduction gear mechanism configured to reduce the speed of, and output, the rotation of the rotor shaft of the electric motor;

a slide member capable of axially moving along the center axis of an output gear in the reduction gear mechanism; and a rotation-linear motion converting mechanism configured to convert the rotary motion of the output gear to a linear motion and transmit the linear motion to the slide member; and a locking mechanism capable of locking and unlocking the rotation of the rotor shaft of the electric motor;

wherein the locking mechanism comprises:

a plurality of locking portions provided in the side surface of one of a plurality of gears constituting the reduction gear mechanism so as to be arranged in the circumferential direction of the one of the plurality of gears;

a locking pin configured to be moved forward and backward with respect to the locking portions, and brought into engagement with any one of the locking portions to lock the one of the gears when the locking pin is moved forward; and a linear solenoid configured to move the locking pin forward and backward;

wherein a plunger of the linear solenoid and the locking pin are formed as separate parts, and disposed coaxial with each other such that an end surface of the plunger and an end surface of the locking pin axially face each other;

the locking pin is made of a non-magnetic material; and a return spring is provided to apply an elastic force to the locking pin, thereby allowing the plunger to move backward along with the locking pin.

Further, the electric brake system according to the present invention has adopted the following constitution.

An electric brake system comprising a disk rotor, a brake pad and an electric linear motion actuator for linearly driving the brake pad to press the brake pad against the disk rotor, thereby applying a braking force to the disk rotor, wherein the electric linear motion actuator is the above mentioned electric linear motion actuator according to the present invention, and the brake pad is connected to the slide member of the electric linear motion actuator.

In the electric brake system having the above mentioned constitution, when the electric motor of the electric linear motion actuator is driven, the speed of the rotation of rotor shaft of the electric motor is reduced by the reduction gear mechanism, to be output through the output gear. The rotation of the output gear is converted to a linear motion by the rotation-linear motion converting mechanism, and transmitted to the slide member. This causes the slide member to move forward, and the brake pad connected to the slide member is pressed against the disk rotor, thereby applying a braking force to the disk rotor.

At the time of parking, the coil of the linear solenoid is energized with the brake pad being pressed against the disk rotor as described above, such that a braking force necessary for parking is applied to the disk rotor. The energization to the coil allows a magnetic circuit to be formed between the coil and the plunger, which in turn causes the plunger to slide toward the locking pin. As a result, the locking pin is moved forward pushed by the plunger to engage with one of the locking portions provided in one of the gears, thereby locking the gears. Once the gears are locked in position, the electric motor is de-energized, thereby preventing unnecessary consumption of the electric energy.

During the locking operation, in which the locking pin is moved forward toward one of the locking portions by being pressed by the plunger, since the locking pin is made of a non-magnetic material, there is no potential risk that the magnetism of the magnetic circuit formed between the plunger and the coil could leak to the locking pin, thereby reducing the magnetic attraction force to the plunger. Therefore, when the coil is energized, the locking pin can be reliably moved forward to a position at which the locking pin is engaged with one of the locking portions.

In addition, since the plunger and the locking pin are prepared as separate parts, and are arranged on the same axis such that an end surface of the plunger and an end surface of the locking pin axially face each other, when the locking pin is engaged with one of the locking portions provided in one of the gears, even if a large moment load is applied to the locking pin by the one of the gears, the load does not act on the plunger. Therefore, there is no potential risk that the plunger could be tilted to cause damage to the radially inner surface of the bobbin supporting the coil.

In the electric linear motion actuator according to the present invention, it is preferred that stainless steel be used as the non-magnetic material, and that the locking pin, made of stainless steel, be subjected to a surface treatment by nitriding or nitrocarburizing so as to improve the wear resistance, thereby improving the durability of the electric linear motion actuator.

In the electric linear motion actuator according to the present invention, the linear solenoid includes: a cylindrical casing; a coil mounted in the casing; a plunger slidably inserted into the coil; and a magnetic attraction core mounted in the head end portion of the casing so as to axially face the plunger, and configured to attract the plunger by a magnetic attraction force to slide the plunger toward the head end portion when the coil is energized; wherein a head cap is provided in the head end portion of the casing so as to axially face the magnetic attraction core, and wherein the head cap and the magnetic attraction core are provided with two respective pin holes disposed coaxial with each other, and wherein the locking pin is slidably inserted in the pin holes such that the locking pin can be supported and guided by the pin holes, at two locations axially displaced from each other. With this arrangement, when the locking pin is engaged with one of the locking portions provided in one of the gears to lock the gears, the moment load applied to the locking pin by the one of the gears can be dispersed to and received by both the pin holes formed in the head cap and the magnetic attraction core. Therefore, the radially inner surfaces of the pin holes, which serve as guiding portions, can be effectively prevented from being damaged.

If a spring housing space for hosing the return spring is provided between the opposed surfaces of the head cap and the magnetic attraction core, grease for lubricating gears can be stored in the spring housing space. This prevents the entry of the grease into the clearance formed between the plunger and the coil, thereby preventing the grease from interfering with the sliding of the plunger.

Effect of the Invention

In the electric linear motion actuator according to the present invention, since the locking pin is made of a non-magnetic material, there is no potential risk that the magnetism of the magnetic circuit formed between the plunger and the coil could leak to the locking pin, thereby reducing the magnetic attraction force to the plunger. Thus, it is possible to reliably move the locking pin forward to a position at which the locking pin is engaged with one of the locking portions, when the coil is energized, allowing for a reliable locking operation.

Further, since the plunger and the locking pin are prepared as separate parts, and are arranged on the same axis such that one of the end surfaces of the plunger, and of the locking pin, axially face each other, when the locking pin is engaged with one of the locking portions provided in one of the gears, even if a large moment load is applied to the locking pin by the one of the gears, the moment load is supported by the radially inner surface of the guiding portion which slidably supports the locking pin, and does not act on the plunger. Therefore, there is no risk that plunger is tilted to cause damage to the radially inner surface of the coil, and it is possible to improve the durability of the electric linear motion actuator.

MODE FOR CARRYING OUT THE INVENTION

Figure 1:
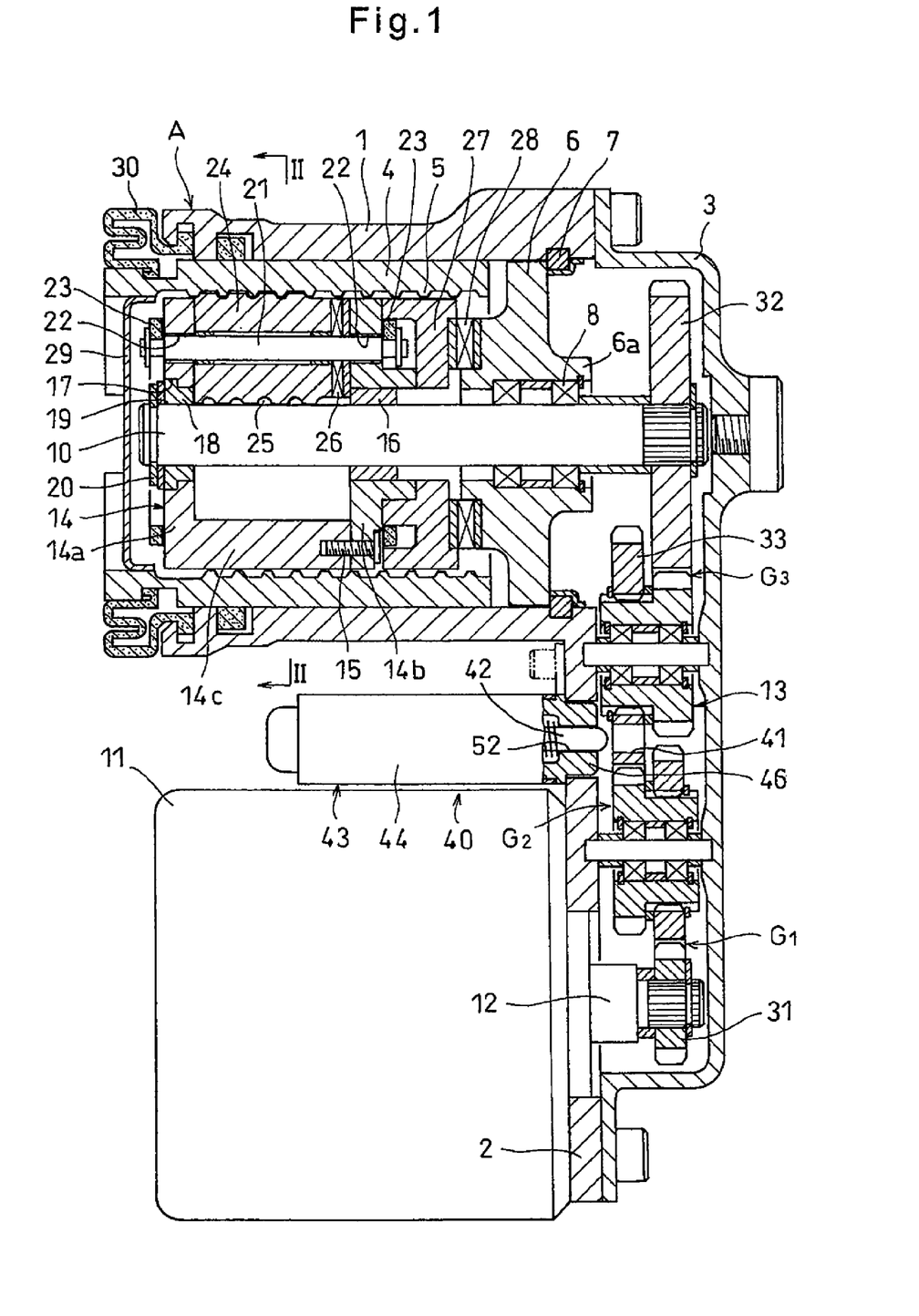
FIG. 1 is a longitudinal sectional view of an electric linear motion actuator embodying the present invention.

The embodiments of the present invention will now be described with reference to the drawings. FIGS. 1 to 5 show an electric linear motion actuator A embodying the present invention. As shown in FIG. 1, the linear motion actuator includes a cylindrical housing 1, and a base plate 2 provided at one end of the housing 1 so as to extend radially outward. The outer surface of the base plate 2 and the opening of the housing 1 at one end thereof are covered by a cover 3.

An outer ring member 4 as a slide member is mounted in the housing 1. The outer ring member 4 is rotationally fixed relative to the housing 1, and is movable in the axial direction along the radially inner surface of the housing 1. The outer ring member 4 has, on its radially inner surface, a helical rib 5 having a V-shaped section.

A bearing member 6 is mounted in the housing 1, on one axial end of the outer ring member 4. The bearing member 6 is a disk-shaped member having a boss 6a at its center. A stopper ring 7 is fitted to the radially inner surface of the housing 1 and configured to prevent the bearing member 6 from moving toward the cover 3.

Two rolling bearings 8 are mounted in the boss 6a of the bearing member 6 so as to be axially spaced apart from each other. The rolling bearings 8 rotatably support a rotary shaft 10 extending along the center axis of the outer ring member 4.

As shown in FIG. 1, the base plate 2 supports an electric motor 11 having a rotor shaft 12 whose rotation is to be transmitted to the rotary shaft 10 through a reduction gear mechanism 13 mounted inside the cover 3.

Figure 2:
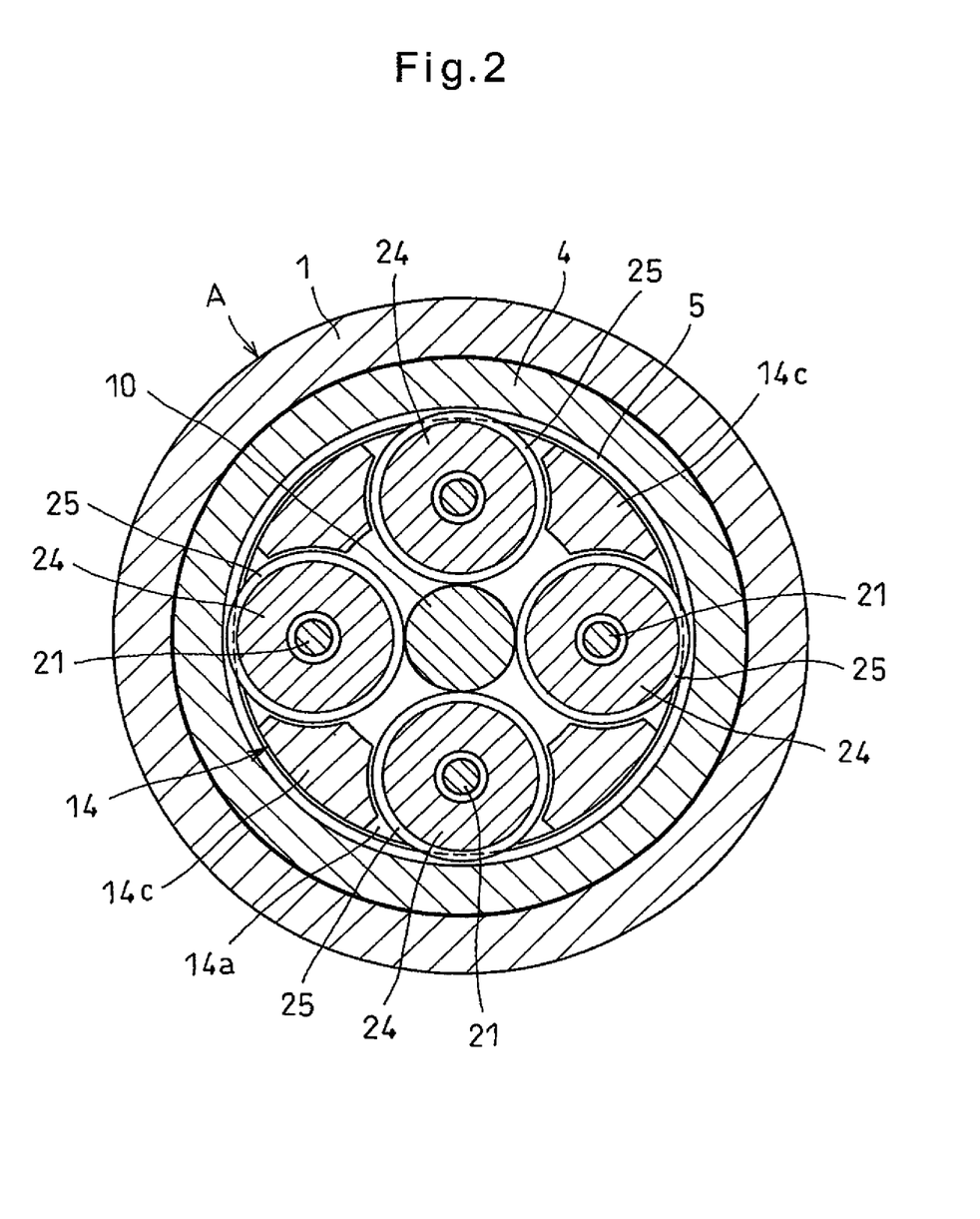
FIG. 2 is a sectional view of the electric linear motion actuator shown in FIG. 1, taken along the line II-II.

A carrier 14 is mounted in the outer ring member 4 so as to be rotatable about the rotary shaft 10. As shown in FIG. 1 and FIG. 2, the carrier includes a pair of disks 14a and 14b facing each other in the axial direction. The disk 14a has, on the outer peripheral portion of its side surface, a plurality of interval adjusting members 14c extending toward the disk 14b while being circumferentially spaced apart from each other. The disks 14a and 14b are coupled to each other by the tightening force provided by screws 15 which are screwed through the disk 14b into the end surfaces of the interval adjusting members 14c.

Of the pair of disks 14a and 14b, the disk 14b, which is the inner disk disposed on the side of the bearing member 6, is rotatably and axially movably supported by a slide bearing 16 mounted between the disk 14b and the rotary shaft 10.

The outer disk 14a is provided with a shaft inserting hole 17 formed at the center portion of the disk 14a, and having a step. A slide bearing 18 is fitted in the shaft inserting hole 17 and is rotatably supported by the rotary shaft 10. A metal washer 19 is fitted at the distal end portion of the rotary shaft 10 adjacent to the outer end surface of the slide bearing 18, and configured to receive a thrust load. A snap ring 20 is further fitted to the distal end portion of the rotary shaft 10, axially outward of the metal washer 19, so that the metal washer 19 stays fitted to the rotary shaft 10.

The carrier 14 is provided with a plurality of roller shafts 21 circumferentially spaced apart from each other, each having their both end portions supported by the respective disks 14a and 14b. Each of the roller shafts 21 has its respective shaft end portions inserted in shaft inserting holes 22 in the shape of elongated holes formed in the respective disks 14a and 14b, so as to be movable in the radial direction. Two elastic rings 23 are wrapped around the roller shafts 21, disposed at the respective shaft end portions of the roller shafts 21, so as to bias the roller shafts 21 radially inwardly.

A planetary roller 24 is rotatably supported by each of the plurality of roller shafts 21. The planetary rollers 24 are mounted between the radially outer surface of the rotary shaft 10 and the radially inner surface of the outer ring member 4, and are pressed against, and thus brought into elastic contact with, the radially outer surface of the rotary shaft 10 by the elastic rings 23 wrapped around the respective shaft end portions of the roller shafts 21. Thus, when the rotary shaft 10 is rotated, the planetary rollers 24 are rotated due to the interfacial friction between the planetary rollers 24 and the radially outer surface of the rotary shaft 10.

As shown in FIG. 1, a helical groove 25 having a V-shaped section is provided on the radially outer surface of each planetary roller 24, at the same pitch as the pitch of the helical rib 5 provided on the outer ring member 4, so as to mesh with the helical rib 5. Alternatively, instead of the helical groove 25, each of the planetary rollers 24 may be provided with a plurality of circumferential grooves axially spaced apart from each other at intervals equal to each other and to the pitch of the helical rib 5.

As shown in FIG. 1, thrust bearings 26 are mounted axially between the inner disk 14b of the carrier 14 and the respective planetary rollers 24. Further, an annular thrust plate 27 is mounted axially between the carrier 14 and the bearing member 6, and a thrust bearing 28 is mounted between the thrust plate 27 and the bearing member 6.

As shown in FIG. 1, the opening of the outer ring member 4 at its end opposite from the cover 3, which is positioned outside of the opening of the housing 1 at its end opposite from the cover 3, is closed by a seal cover 29, thereby preventing the entry of foreign matter into the device.

Further, a bellows 30 has one end portion thereof coupled to the opening of the housing 1 at its end opposite from the cover 3, and the other end portion thereof coupled to the end portion of the outer ring member 4 on the side opposite from the cover 3. The bellows 30 thus prevents the entry of foreign matter into the housing 1.

As shown in FIG. 1, the reduction gear mechanism 13 transmits the rotation of an input gear 31 attached to the rotor shaft 12 of the electric motor 11 to an output gear 32 attached to the shaft end portion of the rotary shaft 10, after sequentially reducing its speed by means of primary to tertiary speed reducing gear trains $G_1$ to $G_3$, thereby rotating the rotary shaft 10. The reduction gear mechanism 13 includes a locking mechanism 40 capable of locking and unlocking the rotation of the rotor shaft 12 of the electric motor 11.

Figure 3:
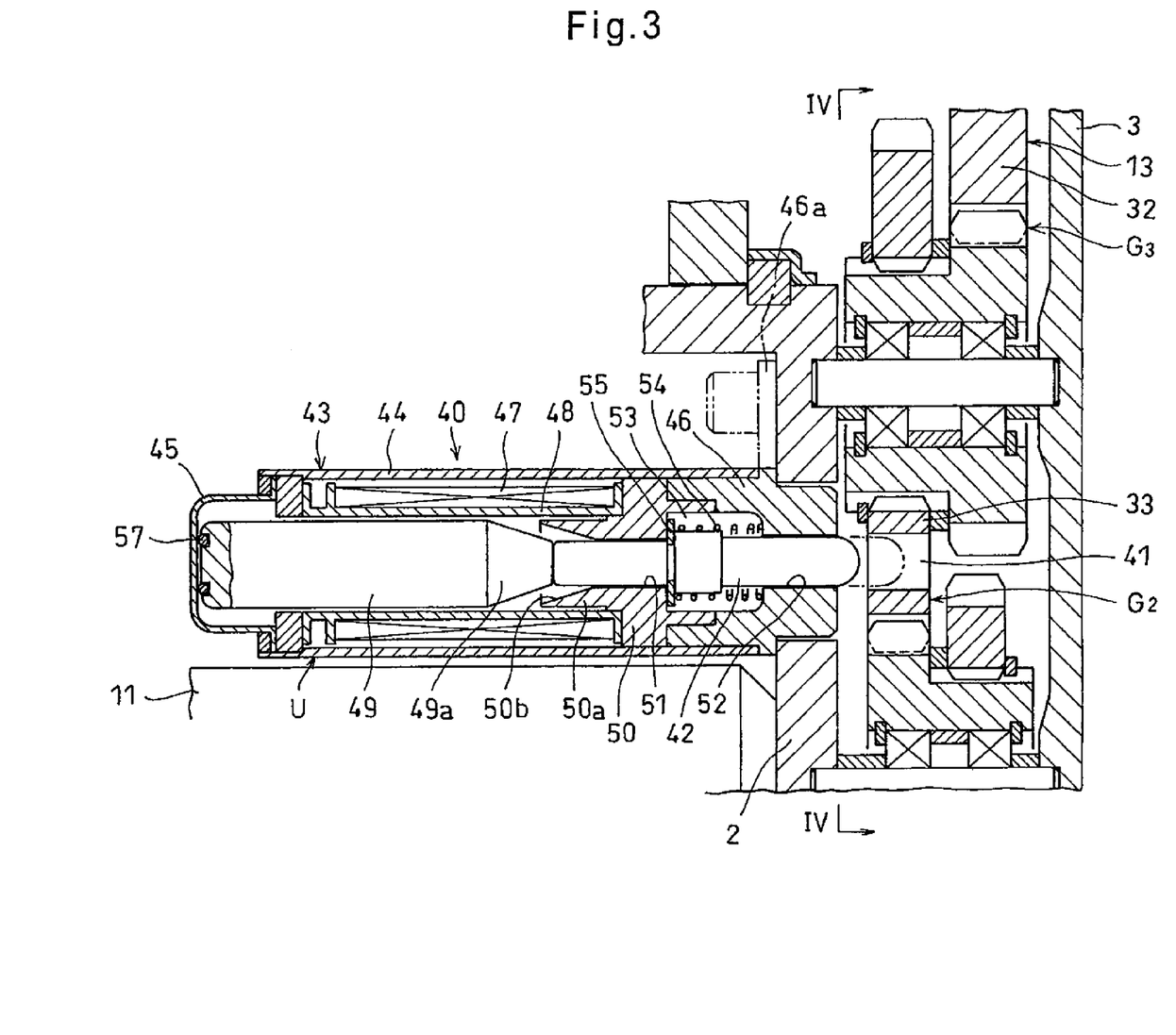
FIG. 3 is an enlarged sectional view of a locking mechanism portion of the electric linear motion actuator shown in FIG. 1.
Figure 4:
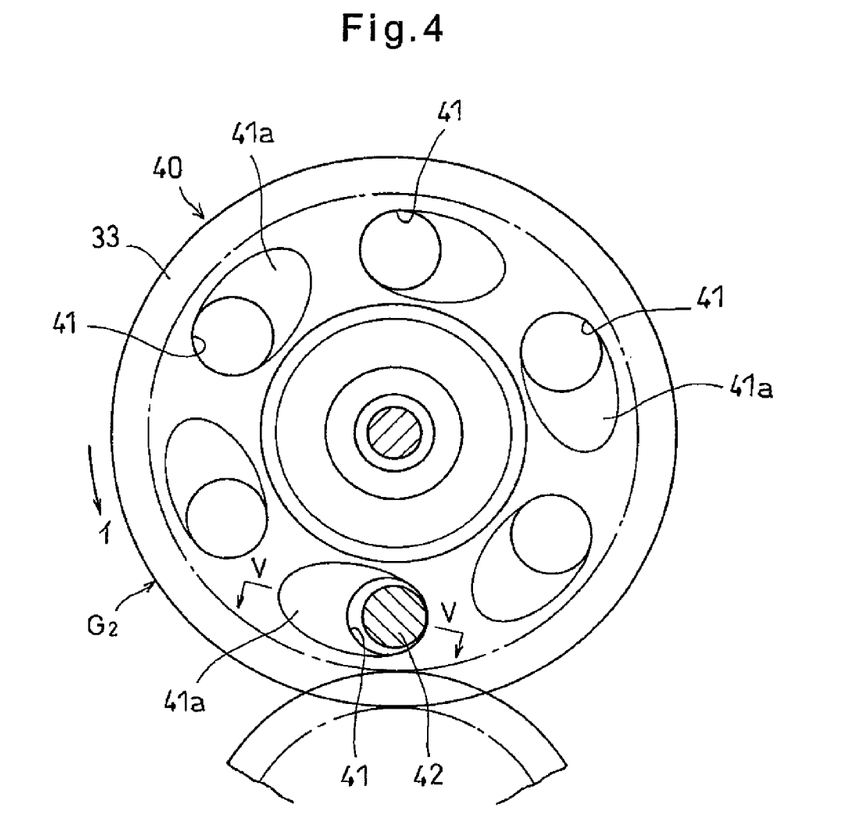
FIG. 4 is a sectional view of the electric linear motion actuator shown in FIG. 3, taken along the line IV-IV.
Figure 5:
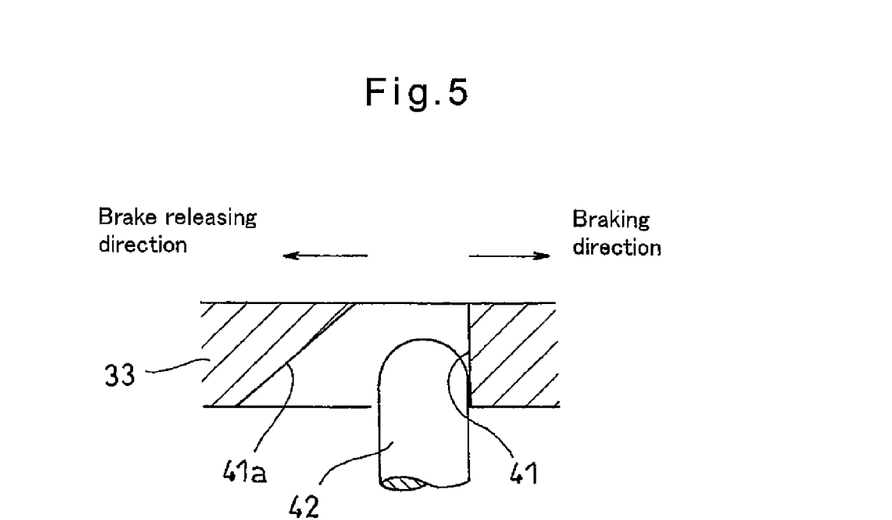
FIG. 5 is a sectional view of the electric linear motion actuator shown in FIG. 4, taken along the line V-V.

As shown in FIG. 3 to FIG. 5, the locking mechanism 40 includes a plurality of locking holes 41, as locking portions, provided in a side surface of an intermediate gear 33 on the output side of the secondary speed reducing gear train $G_2$ so as to be arranged at equal intervals on a common circle. The locking mechanism 40 further includes a locking pin 42 capable of being moved forward and backward with respect to one point on the pitch circle of the plurality of locking holes 41; and a linear solenoid 43 capable of moving the locking pin 42 forward and backward. When the locking pin is moved forward by the linear solenoid 43 to engage with one of the locking holes 41, the intermediate gear 33 can be locked in position.

The linear solenoid 43 includes: a cylindrical casing 44 whose opening on the tail end side is closed by a tail cap 45, and whose opening on the head end side is closed by a head cap 46; a coil 47 mounted in the casing 44; a cylindrical bobbin 48 supporting the radially inner surface of the coil 47; and a plunger 49 slidably mounted in the bobbin 48.

A magnetic attraction core 50 is mounted in the casing 44 so as to axially face the head cap 46, and the magnetic attraction core 50 and the head cap 46 are provided with a pin hole 51 and a pin hole 52 disposed on the same axis, respectively. The locking pin 42, which is formed as a separate member from the plunger 49, is inserted in the pin holes 51 and 52, so that the locking pin 42 is slidably supported and guided by the two axially spaced apart pin holes 51 and 52.

Further, a spring housing space 53 is defined between the opposed surfaces of the head cap 46 and the magnetic attraction core 50. A return spring 54 is mounted in the spring housing space 53 to press a snap ring 55 fitted to the outer periphery of the locking pin 42, thereby biasing the locking pin 42 and the plunger 49 toward a disengaging position.

This assembly unit U comprising the linear solenoid 43 and the locking pin 42 is positioned between the housing 1 and the electric motor 11, and attached to the base plate 2 by inserting the distal end portion of the head cap 46 into an insertion hole 56 formed in the base plate 2, and screwing a mounting piece 46a provided at the outer periphery of the head cap 46 to the base plate 2.

In this embodiment, the bobbin 48 supporting the coil 47 is made of resin or copper. Both the plunger 49 and the magnetic attraction core 50 are made of a ferromagnetic material so that a magnetic circuit is be formed between the coil 47 and both the plunger 49 and the magnetic attraction core 50. The ferromagnetic material is low carbon steel in this embodiment, but is not limited thereto.

The magnetic attraction core 50 includes a cylindrical portion 50a formed at the rear end portion thereof, and inserted in the bobbin 48. The plunger 49 has at the distal end portion thereof a tapered shaft portion 49a configured to be fitted into a tapered hole 50b formed in the cylindrical portion 50a.

On the other hand, the locking pin 42 and head cap 46 are made of a non-magnetic material so as to prevent the magnetic leakage. In this embodiment, the locking pin 42 is made of stainless steel, which is a non-magnetic material, and the locking pin 42 is subjected to a surface treatment by nitriding or nitrocarburizing, in order to improve its wear resistance. Alternatively, the locking pin 42 may be subjected to plating, instead of the surface treatment by nitriding or nitrocarburizing.

As shown in FIG. 4 and FIG. 5, one of the circumferentially-opposed end surfaces of each locking hole 41 provided in the intermediate gear 33 is formed into a tapered surface 41a tapered such that the locking pin 42 tends to be guided and moved backward by the tapered surface 41a.

Figure 6:
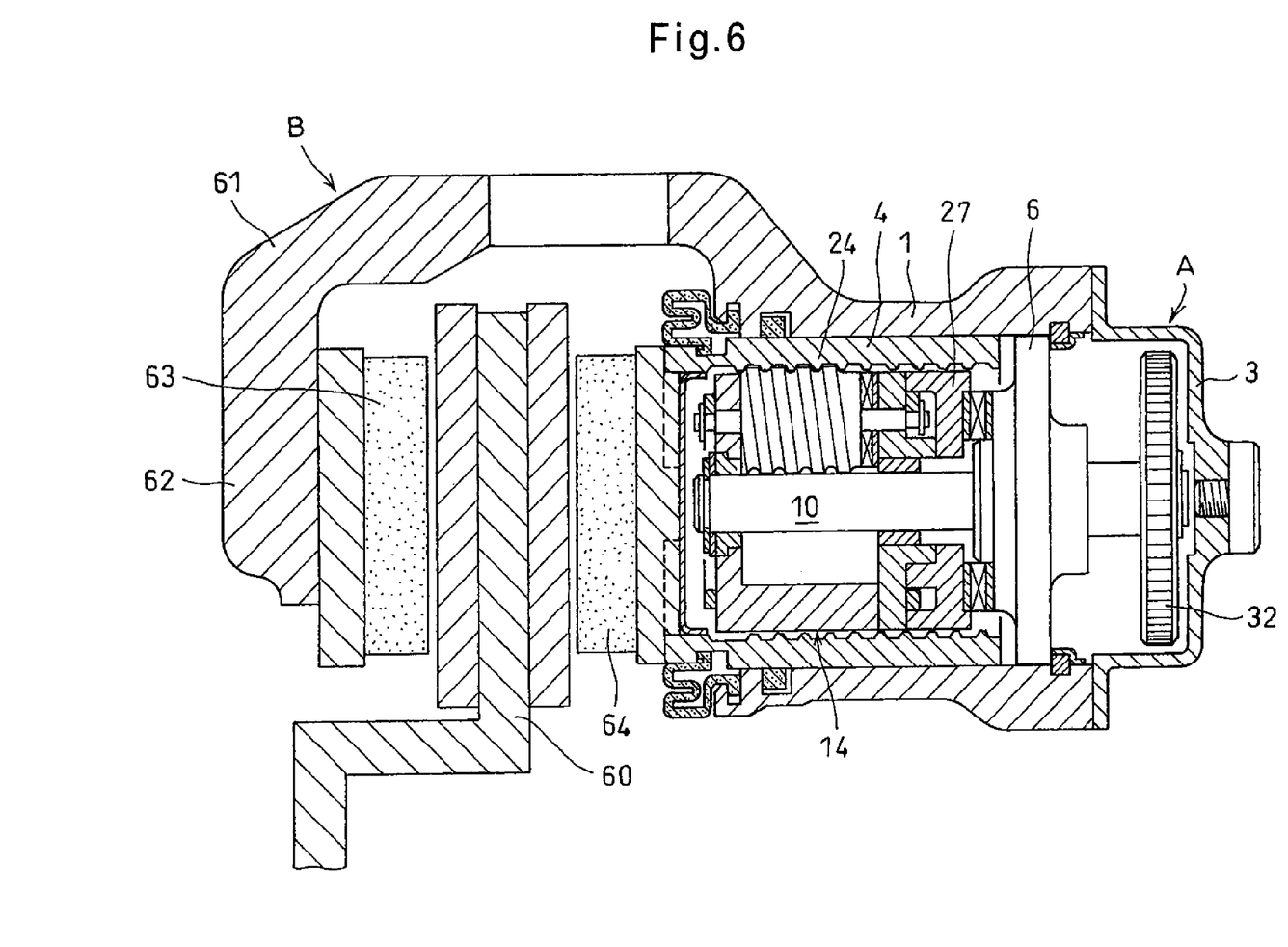
FIG. 6 is a longitudinal sectional view of an electric brake system embodying the present invention.

FIG. 6 shows an electric brake system B including the electric linear motion actuator A of the above described embodiment. The electric brake system B includes: a disk rotor 60 configured to rotate together with a vehicle wheel, not shown; a caliper 61 disposed so as to be positioned at the outer periphery of the disk rotor 60, and including a claw portion 62 provided at one end portion thereof so as to axially face the outer peripheral portion of the outer side surface of the disk rotor 60; and an outer brake pad 63 attached to the claw portion 62.

The housing of the electric linear motion actuator A is integrally formed at the other end of the caliper 61. The outer ring member 4 is disposed so as to axially face the outer peripheral portion of the inner side surface of the disk rotor 60, and an inner brake pad 64 is attached to the distal end portion of the outer ring member 4.

The caliper 61 is supported by a holder (not shown) supported by a stationary member such as a knuckle so as to be movable in the axial direction of the disk rotor 60.

With the electric linear motion actuator A mounted to the electric brake system B as shown in FIG. 6, when the electric motor 11, see FIG. 1, is driven, the rotation of the rotor shaft 12 of the electric motor 11 is transmitted to the rotary shaft 10 after its speed has been reduced by the reduction gear mechanism 13.

Since the radially outer surfaces of the planetary rollers 24 are kept in elastic contact with the radially outer surface of the rotary shaft 10, when the rotary shaft 10 is rotated, the planetary rollers 24 rotate about their respective center axes while revolving around the rotary shaft 10, due to the interfacial friction between the planetary rollers 24 and the rotary shaft 10.

At this time, since the helical rib 5 provided on the radially inner surface of the outer ring member 4 is in meshing engagement with the helical grooves 25 formed on the radially outer surfaces of the respective planetary rollers 24, the outer ring member 4 is moved in the axial direction due to the engagement between the helical grooves 25 and the helical rib 5, and the inner brake pad 64 coupled to the outer ring member 4 comes into abutment with the disk rotor 60 to start pressing the disk rotor 60 in the axial direction. The reaction force to this pressing force moves the caliper 61 in the direction in which the outer brake pad 63 attached to the claw portion 62 is moved closer toward the disk rotor 60, and the outer brake pad 63 comes into abutment with the disk rotor 60. This allows the outer brake pad 63 and the inner brake pad 64 to firmly sandwich and press the outer peripheral portion of the disk rotor 60 from both sides in the axial direction, thereby applying a braking force to the disk rotor 60.

At the time of parking, the coil 47 of the linear solenoid 43 is energized with the outer brake pad 63 and the inner brake pad 64 sandwiching and pressing the disk rotor 60 as described above such that the braking force is applied to the disk rotor 60. The energization to the coil 47 allows magnetic circuits to be formed between the coil 47 and the plunger 49 and between the coil 47 and the magnetic attraction core 50. As a result, the plunger 49 moves toward the magnetic attraction core 50 due to the magnetic attraction force provided by the magnetic attraction core 50 to the plunger 49, to be adhered to the magnetic attraction core 50.

Since the plunger 49 presses the locking pin 42 at this time, the locking pin 42 is moved forward toward the side surface of the intermediate gear 33. When the locking pin 42 is moved forward, if one of the plurality of the locking holes 41 is at a position facing the locking pin 42, the locking pin 42 engages with the one of the locking holes 41 as shown in FIG. 5, and the engagement therebetween allows the intermediate gear 33 to be locked. Since the rotor shaft 12 of the electric motor 11 is also locked at this time, the electric motor 11 can be kept de-energized, thereby preventing an unnecessary consumption of the electric energy.

When the locking pin 42 is moved forward, if the locking pin 42 is not aligned with any one of the locking holes 41, it is not possible to bring the locking pin 42 into engagement with one of the locking holes 41. If the above mentioned situation occurs, by driving the electric motor 11 with the locking pin 42 moved forward, the intermediate gear 33 can be rotated in the braking direction (the direction shown by the arrow in FIG. 4) to align one of the locking holes 41 with the locking pin 42, thereby bringing the locking pin 42 into engagement with the one of the locking holes 41.

When the locking pin 42 is engaged with one of the locking holes 41 to lock the intermediate gear 33 in position as described above, in other words, when the rotor shaft 12 of the electric motor 11 is locked in position, a rotation torque in the brake-releasing direction is applied to the respective gears in the reduction gear mechanism 13 due to the reaction force from the disk rotor 60. As a result, a moment load is applied to the locking pin 42 so as to tilt the locking pin 42.

At this time, since the locking pin 42 is slidably supported at two points in the axial direction by the pin hole 51 formed in the magnetic attraction core 50 and the pin hole 52 formed in the head cap 46, the moment load applied to the locking pin 42 from the gear 33 is dispersed to and received by both of the pin hole 51 in the magnetic attraction core 50 and the pin hole 52 in the head cap 46. Thus, there is no risk that the radially inner surfaces of the pin holes 51 and 52 could be damaged.

In this embodiment, minute gaps are provided between the respective pin holes 51 and 52 and the locking pin 42 so as to allow the locking pin 42 to slide therethrough. Therefore, the locking pin 42 is allowed to tilt due to the moment load applied by the intermediate gear 33 to the locking pin 42, within the range permitted by the gaps.

At this time, if the plunger 49 is formed integrally with the locking pin 42, the plunger 49 tilts together with the locking pin 42, and the amount the distal end portion of the plunger 49 moves in the radial direction is increased. As a result, a large moment load is applied to the radially inner surface of the bobbin 48, which has a low mechanical strength, possibly damaging the radially inner surface.

However, since the locking pin 42 and the plunger 49 are formed as separate parts in the embodiment of the present invention, the plunger 49 does not tilt even if the locking pin 42 is tilted, and there is no risk of damaging the radially inner surface of the bobbin 48.

Further, since the locking pin 42 is made of stainless steel, which is a non-magnetic material, when the coil 47 is energized, the magnetism of the magnetic circuits formed between the coil 47 and the plunger 49 and between the coil 47 and the magnetic attraction core 50 are prevented from leaking to the locking pin 42. Therefore, the magnetic attraction force to the plunger 49 is not reduced, and the locking pin 42 can be reliably moved forward toward the intermediate gear 33 by energizing the coil 47, thereby allowing for a reliable locking operation.

As shown in FIG. 3, by providing the spring housing space 53 for housing the return spring 54 between the opposed surfaces of the head cap 46 and the magnetic attraction core 50, grease for lubricating gears which enters the pin hole 52 of the head cap 46 can be stored in the spring housing space 53, and thus it is possible to prevent the entry of the grease for lubricating gears into the clearance formed between the opposed surfaces of the plunger 49 and the bobbin 48 supporting the coil 47. This prevents the grease for lubricating gears from interfering with the sliding of the plunger 49.

In order to release the locking of the rotor shaft 12 of the electric motor 11, the coil 47 is de-energized, and the electric motor 11 is driven to rotate the intermediate gear 33 in the braking direction shown in FIG. 5, thereby disengaging the locking pin 42 from one side surface of the locking hole 41. This allows the locking pin 42 to move backward to an unlocking position at which the locking pin 42 is moved out of the one of the locking holes 41, by a pressing force provided by the tapered surface 41a formed on the other side surface of the locking hole 41 to push back the distal end portion of the locking pin 42, or by the pressing force provided by the return spring 54.

At this time, the plunger 49 comes violently into abutment with the tail cap 45, to produce a hitting sound. In order to prevent the generation of the hitting sound, a ring-shaped elastic member 57 is fitted to the rear end surface of the plunger 49, as shown in FIG. 3, so that the impact at the time of abutment between the plunger 49 and the tail cap 45 can be absorbed by the elastic deformation of the elastic member 57.

In the electric linear motion actuator shown in FIG. 1, as the rotation-linear motion converting mechanism, which is configured to convert the rotary motion of the rotary shaft 10 to a linear motion, an embodiment is shown in which the planetary rollers 24 are mounted between the radially outer surface of the rotary shaft 10 and the radially inner surface of the housing 1, and the helical grooves 25 or circumferential grooves provided on the radially outer surfaces of the respective planetary rollers 24 are in meshing engagement with the helical rib 5 provided on the radially inner surface of the outer ring member 4. However, the rotation-linear motion converting mechanism is not limited to this embodiment.

For example, as shown in FIG. 10 in Patent Document 3, an embodiment is also possible in which a helical rib is provided on the radially outer surface of the rotary shaft, and a plurality of circumferential grooves are provided at the same pitch as the helical rib on the radially outer surfaces of a plurality of planetary rollers mounted between the radially outer surface of the rotary shaft and the radially inner surface of the housing, wherein the rotation of the rotary shaft allows the planetary rollers to rotate about their respective center axes while revolving around the rotary shaft, due to the engagement between the helical rib and the circumferential grooves, so that the planetary rollers can be moved in the axial direction.

DESCRIPTION OF SYMBOLS 4 outer ring member (slide member)
11 electric motor
12 rotor shaft
13 reduction gear mechanism
33 intermediate gear
40 locking mechanism
41 locking holes (locking portions)
42 locking pin
43 linear solenoid
44 casing
46 head cap
47 coil
49 plunger
50 magnetic attraction core
51 pin hole
52 pin hole
53 spring housing space
54 return spring
60 disk rotor

The invention claimed is:

1. An electric linear motion actuator comprising:
an electric motor having a rotor shaft;
a reduction gear mechanism configured to reduce the speed of, and output, rotation of the rotor shaft of the electric motor;
a slide member capable of axially moving along a center axis of an output gear in the reduction gear mechanism; and
a rotation-linear motion converting mechanism configured to convert a rotary motion of the output gear to a linear motion and transmit the linear motion to the slide member; and
a locking mechanism capable of locking and unlocking the rotation of the rotor shaft of the electric motor,
wherein the locking mechanism comprises:
a plurality of locking portions provided in a side surface of one of a plurality of gears constituting the reduction gear mechanism so as to be arranged in a circumferential direction of the one of the plurality of gears;
a locking pin configured to be moved forward and backward with respect to the locking portions, and brought into engagement with any one of the locking portions to lock the one of the gears when the locking pin is moved forward; and
a linear solenoid configured to move the locking pin forward and backward, the linear solenoid comprising a plunger,
wherein the plunger and the locking pin are formed as separate parts, the plunger and the locking pin are disposed coaxial with each other such that an end surface of the plunger and an end surface of the locking pin axially face each other, and the end surface of the plunger and the end surface of the locking pin are shaped and disposed such that the plunger and the locking pin are brought into abutment with each other only at the end surface of the plunger and the end surface of the locking pin,
wherein the locking pin is made of a non-magnetic material, and
wherein a return spring is provided to apply an elastic force to the locking pin, thereby allowing the plunger to move backward along with the locking pin.

2. The electric linear motion actuator according to claim 1, wherein the non-magnetic material is stainless steel, and the locking pin is subjected to a surface treatment.

3. The electric linear motion actuator according to claim 2, wherein the surface treatment is nitriding treatment or nitrocarburizing treatment.

4. The electric linear motion actuator according to claim 1, wherein the linear solenoid further comprises: a cylindrical casing; a coil mounted in the casing, the plunger being slidably inserted in the coil; and a magnetic attraction core mounted in a head end portion of the casing so as to axially face the plunger, and configured to attract the plunger by a magnetic attraction force to slide the plunger toward the head end portion when the coil is energized;
wherein a head cap is provided in the head end portion of the casing so as to axially face the magnetic attraction core, and
wherein the head cap and the magnetic attraction core are provided with two respective pin holes disposed coaxial with each other, and wherein the locking pin is slidably inserted in the pin holes such that the locking pin can be supported and guided by the pin holes, at two locations axially displaced from each other.

5. The electric linear motion actuator according to claim 4, wherein a spring housing space for housing the return spring is provided between opposed surfaces of the head cap and the magnetic attraction core.

6. An electric brake system comprising a disk rotor, a brake pad, and an electric linear motion actuator for linearly driving the brake pad to press the brake pad against the disk rotor, thereby applying a braking force to the disk rotor,
wherein the electric linear motion actuator is the electric linear motion actuator according to claim 1, and the brake pad is connected to the slide member of the electric linear motion actuator.

7. The electric linear motion actuator according to claim 2, wherein the linear solenoid further comprises: a cylindrical casing; a coil mounted in the casing, the plunger being slidably inserted in the coil; and a magnetic attraction core mounted in a head end portion of the casing so as to axially face the plunger, and configured to attract the plunger by a magnetic attraction force to slide the plunger toward the head end portion when the coil is energized;
wherein a head cap is provided in the head end portion of the casing so as to axially face the magnetic attraction core, and
wherein the head cap and the magnetic attraction core are provided with two respective pin holes disposed coaxial with each other, and wherein the locking pin is slidably inserted in the pin holes such that the locking pin can be supported and guided by the pin holes, at two locations axially displaced from each other.

8. The electric linear motion actuator according to claim 3, wherein the linear solenoid further comprises: a cylindrical casing; a coil mounted in the casing, the plunger being slidably inserted in the coil; and a magnetic attraction core mounted in a head end portion of the casing so as to axially face the plunger, and configured to attract the plunger by a magnetic attraction force to slide the plunger toward the head end portion when the coil is energized;

wherein a head cap is provided in the head end portion of the casing so as to axially face the magnetic attraction core, and wherein the head cap and the magnetic attraction core are provided with two respective pin holes disposed coaxial with each other, and wherein the locking pin is slidably inserted in the pin holes such that the locking pin can be supported and guided by the pin holes, at two locations axially displaced from each other.

9. The electric linear motion actuator according to claim 7, wherein a spring housing space for housing the return spring is provided between opposed surfaces of the head cap and the magnetic attraction core.

10. The electric linear motion actuator according to claim 8, wherein a spring housing space for housing the return spring is provided between opposed surfaces of the head cap and the magnetic attraction core.

11. An electric brake system comprising a disk rotor, a brake pad, and an electric linear motion actuator for linearly driving the brake pad to press the brake pad against the disk rotor, thereby applying a braking force to the disk rotor, wherein the electric linear motion actuator is the electric linear motion actuator according to claim 2, and the brake pad is connected to the slide member of the electric linear motion actuator.

12. An electric brake system comprising a disk rotor, a brake pad, and an electric linear motion actuator for linearly driving the brake pad to press the brake pad against the disk rotor, thereby applying a braking force to the disk rotor, wherein the electric linear motion actuator is the electric linear motion actuator according to claim 3, and the brake pad is connected to the slide member of the electric linear motion actuator.

13. An electric brake system comprising a disk rotor, a brake pad, and an electric linear motion actuator for linearly driving the brake pad to press the brake pad against the disk rotor, thereby applying a braking force to the disk rotor, wherein the electric linear motion actuator is the electric linear motion actuator according to claim 4, and the brake pad is connected to the slide member of the electric linear motion actuator.

14. An electric brake system comprising a disk rotor, a brake pad, and an electric linear motion actuator for linearly driving the brake pad to press the brake pad against the disk rotor, thereby applying a braking force to the disk rotor, wherein the electric linear motion actuator is the electric linear motion actuator according to claim 5, and the brake pad is connected to the slide member of the electric linear motion actuator.

15. An electric brake system comprising a disk rotor, a brake pad, and an electric linear motion actuator for linearly driving the brake pad to press the brake pad against the disk rotor, thereby applying a braking force to the disk rotor, wherein the electric linear motion actuator is the electric linear motion actuator according to claim 7, and the brake pad is connected to the slide member of the electric linear motion actuator.

16. An electric brake system comprising a disk rotor, a brake pad, and an electric linear motion actuator for linearly driving the brake pad to press the brake pad against the disk rotor, thereby applying a braking force to the disk rotor, wherein the electric linear motion actuator is the electric linear motion actuator according to claim 8, and the brake pad is connected to the slide member of the electric linear motion actuator.

17. An electric brake system comprising a disk rotor, a brake pad, and an electric linear motion actuator for linearly driving the brake pad to press the brake pad against the disk rotor, thereby applying a braking force to the disk rotor, wherein the electric linear motion actuator is the electric linear motion actuator according to claim 9, and the brake pad is connected to the slide member of the electric linear motion actuator.

18. An electric brake system comprising a disk rotor, a brake pad, and an electric linear motion actuator for linearly driving the brake pad to press the brake pad against the disk rotor, thereby applying a braking force to the disk rotor, wherein the electric linear motion actuator is the electric linear motion actuator according to claim 10, and the brake pad is connected to the slide member of the electric linear motion actuator.

\* \* \* \* \*